Patented Aug. 29, 1944

2,356,823

UNITED STATES PATENT OFFICE 2,356,823

ORGANIC DYESTUFFS OF THE THIONAPHTHENONE SERIES AND PROCESS OF MAKING THE SAME

John Elton Cole and Benjamin Franklin Skiles, Wilmington, Del., assignors to E. I. du Pont de Nemours & Company, Wilmington, Del., a corportion of Delaware No Drawing. Application September 21, 1939, Serial No. 295,918

7 Claims. (Cl. 260—330)

This invention relates to novel organic dyestuffs and to processes for making the same. More particularly, this invention deals with novel organic compounds of the group which are obtainable by condensing a thioindoxyl compound with a benzenoid compound having a reactive oxygen atom, for instance a benzene aldehyde or a nitroso-benzene compound, the characteristic of the novel series being that the dyestuff contains at least one hydroxy alkyl radical, or an ester thereof, attached to at least one of the aryl nuclei of the principal components, that is the thioindoxyl or the benzenoid compound, by the agency of an oxygen, sulfur or nitrogen atom.

We have found that the dyestuffs of the above novel series possess excellent properties for dyeing artificial silk fiber, including in this expression both cellulose esters and ethers, for instance cellulose acetate, and synthetic linear polyamide derivatives known in the art under the generic name of nylon. The novel compounds possess improved dispersibility in water compared to similar compounds which do not possess the characteristic hydroxyalkyl groups above mentioned, and are much less phototropic (that is, changing shade under the influence of sunlight). Their dyeing upon artificial silk fiber possesses good light fastness.

Our novel compounds of this invention may be expressed by the general formula

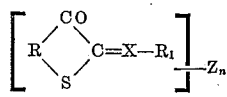

wherein R is an ortho-arylene radical of the benzene or naphthalene series, $R_1$ is an aryl radical of the benzene series, X stands for N or CH, n is an integer, usually 1 or 2, while Z stands for an aliphatic side chain which contains at least one alkyl radical in turn containing at least one OH group or an ester thereof and being attached to one of the aromatic radicals R and $R_1$ by the agency of a non-carbonic atom, for instance oxygen, sulfur or nitrogen.

The nature of this substituent Z will be better understood by considering the following typical members thereof representing several variations permissible in the symbol Z within the scope of this invention. Thus, Z may represent a hydroxy-alkoxy radical, for instance

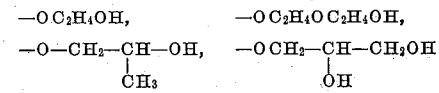

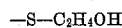

a hydroxy-alkyl-thio radical, for instance $$-S-C_2H_4OH$$

a hydroxy-alkylamino-radical, for instance

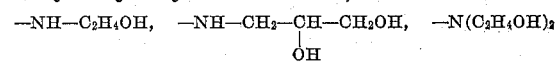

an ester of any of these, for instance

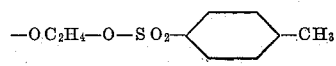

or in general $-OC_2H_4-OY$, wherein Y is the radical of an acid capable of esterifying an OH group. More particularly, Y is the radical of an acid of the group which are generally employed for forming leuco-esters of vat dyes, and is more commonly represented by such acids as sulfuric, phosphoric, boric, p-toluene-sulfonic, etc.

The scope of the symbol $=X-R_1$ is best understood by remembering that it is derived by the removal of oxygen from a benzaldehyde or a nitroso-benzene compound. The benzene nucleus may carry further substituents such as alkyl, alkoxy, hydroxy, amino, mono- and dialkyl-amino, mercapto. Where the substituent contains a free hydrogen atom, it may be converted on the finished dyestuff into the form Z as above defined by treatment with ethylene chlorohydrin or other compound capable of replacing the free hydrogen by a hydroxy-alkyl radical. The dyestuff may thus be given an extra Z-substituent in addition to whatever number of these it may have derived from the intermediates employed.

The group

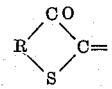

is the radical of a thioindoxyl compound, such as 3-hydroxy-thionaphthene, naphtho-thioindoxyl or nuclear substitution derivatives of these, such as alkyl, alkoxy, halogen, hydroxy, or the substituent Z as above defined.

Compounds having the fundamental nuclear structures

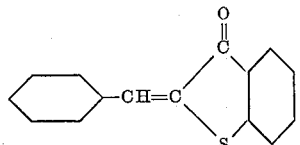

and

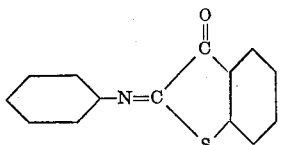

may for simplicity be designated as aralkylidene-thionaphthenones and arylimino-thionaphthenones, respectively. Accordingly, our invention may be defined as dealing with novel compounds selected from the group consisting of aralkylidene-thio-naphthenones and arylimino - thionaphthenones, characterized by possessing in at least one of their homocyclic nuclei at least one hydroxy-alkyl substituent which is attached to said homocyclic nucleus by a non-carbonic atom of the group consisting of oxygen, sulfur and nitrogen, and wherein the hydroxy group is free or is esterified by the radical of an inorganic polybasic acid.

The synthesis of our novel series of compounds may be effected in two principal manners:

I. The selected thioindoxyl compound may be condensed with a benzaldehyde or a nitrosophenol compound in usual manner, for instance by reacting the same in aqueous-alcoholic medium in the presence of alkali, except that the initial material is so chosen that at least one of the principal components, that is the thioindoxyl on the one hand or the benzaldehyde or nitrosobenzene derivative on the other hand, contains a substituent of the form Z as above defined. In this procedure, the Z substituent has a free OH group to begin with, and if an ester thereof is desired, the dyestuff is subjected to esterification by means of an acid (such as sulfuric, phosphoric, etc.) after synthesis.

II. The condensation aforementioned is carried out upon components which do not possess a substituent Z as above defined but at least one possesses a substituent having at least one exchangeable hydrogen atom, for instance, hydroxy, mercapto, amino or monoalkyl-amino. The synthesized dyestuff is then treated with ethylene oxide, ethylene - chlorhydrin, glyceryl - chlorhydrin, or any other compound capable of introducing a hydroxy-alkyl radical into said hydroxy, mercapto, amino or monoalkylamino group.

Where ethylene oxide is employed for the latter purpose, the proportion thereof may be so chosen as to introduce but one ethylene-oxide radical, forming the simple Z-substituent —O—$C_2H_4OH$, or to introduce several such radicals forming a chain typified by —$OC_2H_4OC_2H_4OH$.

In this synthesis as in the one first mentioned, the OH groups in the finished dyestuffs may be esterified by means of sulfuric, phosphoric or similar acid.

Where a polybasic acid is employed for this esterification, for instance sulfuric, phosphoric or boric, the extra valency of the acid may be neutralized by an aryl amine, for instance a diaryl guanidine, to convert the dyestuff into a salt which is soluble in alcohol and may therefore be used for coloring wood, leather and lacquers.

Without limiting our invention to any particular procedure, the following examples are given to illustrate our preferred mode of operation. Parts mentioned are by weight.

*Example 1*

The product having the formula

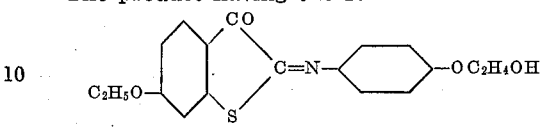

was prepared as follows:

85 parts of 6-ethoxy-3-oxy-thionaphthene were dissolved in 425 parts of ethyl alcohol, 25 parts 30% caustic soda solution and 425 parts water. The resulting solution was stirred into 400 parts water at 40° C., and 80 parts of a paste containing 75% p-nitrosophenol were added. After stirring for 2 hours longer, the product was filtered off and washed with 20% salt solution until the filtrate was colorless. The product was dissolved in 1500 parts of water, and 10 parts of ethylene chlorhydrin were added. The mixture was heated at 80° C. for 20 minutes, when 16.7 parts of 30% caustic soda solution and 10 parts of ethylene chlorhydrin were added. After heating at 80° C. for 30 minutes, another similar addition of caustic soda and ethylene chlorhydrin was made. The mixture was then cooled and the product filtered off, washed with water and dried.

The product has a melting range of 150 to 155° C. and dyes acetate silk and nylon in yellow shades. By treating the above color with concentrated sulfuric acid, the sulfate ester is formed. The sodium salt of this product is water soluble and dyes acetate silk in lemon-yellow shades.

*Example 2*

The product having the formula

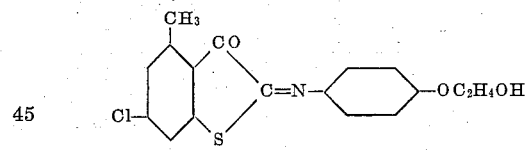

was prepared as follows:

20 parts of 4-methyl-6-chlor-3-oxy-thionaphthene were dissolved at 90° C. in 1000 parts of 3% caustic soda solution and cooled to 50° C. To this suspension was added a paste containing 12.5 parts p-nitrosophenol, and the mixture was stirred at 40 to 50° C. for 1 hour. To this solution were added 250 parts of salt, and after cooling to room temperature, the product was filtered off and washed with 20% salt solution until the filtrate was colorless. The product was dissolved in 500 parts of water at 80° C. and a total of 10 parts of ethylene chlorhydrin was added in 4 portions in the course of 2 hours while adding caustic soda at frequent intervals to hold the mixture alkaline in reaction. The mixture was then cooled and the product filtered off, washed with water and dried. The product dyed acetate silk and nylon in reddish yellow shades.

*Example 3*

The product having the probable formula

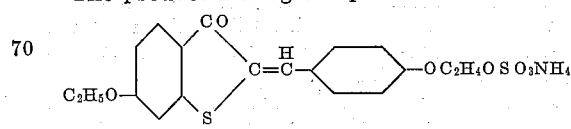

was prepared as follows:

49 parts 6-ethoxy-3-oxy-thionaphthene and 31 parts p-hydroxy-benzaldehyde in 800 parts alcohol and 200 parts concentrated hydrochloric acid were heated at reflux temperature for 1½ hours. The mixture was then drowned in 3000 parts water and made alkaline by adding caustic soda solution. The resulting solution was filtered and the product precipitated by acidification with hydrochloric acid, filtered off and washed acid-free. This product was then dissolved in 500 parts of water and 33 parts 30% caustic soda solution and heated at 80° C. for 2 hours with 20 parts ethylene chlorhydrin and 33 parts 30% caustic soda solution. After cooling, the separated product was filtered off, washed and dried. This product was dissolved in 150 parts of concentrated sulfuric acid at 0° C. and drowned by pouring onto ice. The separated sulfate ester was filtered off, washed and converted to the ammonium salt by dissolving in water and an excess of ammonium hydroxide. The resulting solution was evaporated to dryness in vacuum at 60° C. The resulting product dyes acetate silk from an aqueous solution in yellow shades.

By dissolving this product in water and adding an equivalent amount of di-o-tolyl-guanidine-hydrochloride in aqueous solution, a yellow product is precipitated. This product, when filtered off and dried, is soluble in alcohol, and dyes paper, wood, leather and lacquer in yellow shades that are fast to light.

*Example 4*

The product having the formula

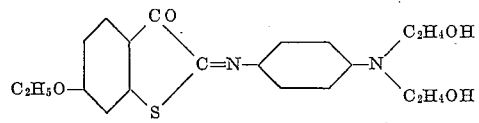

was prepared as follows:

To a solution of 9.7 parts of 6-ethoxy-3-oxy-thionaphthene in 1000 parts of 3% caustic soda solution at 80° C. were added 10.5 parts of p-nitroso-N,N-diethanolaniline in 500 parts of water at 80° C. After stirring at this temperature for ½ hour, the separated red product was filtered off, washed alkali-free and dried. This product dyed acetate silk and nylon from a neutral bath in reddish scarlet shades.

*Example 5*

The compound of the following formula

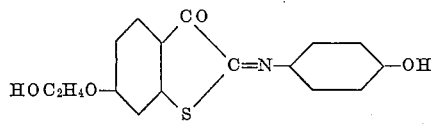

was prepared as follows:

28 parts of 6-ethanol-oxy-3-oxy-thionaphthene were dissolved in 140 parts alcohol, 9 parts 30% caustic soda solution and 140 parts water and diluted further with 130 parts water, and the temperature was adjusted to 40° C. To this mixture was added 19.7 parts of p-nitroso-phenol and the mixture was stirred at 40 to 50° C. for 1 hour. Then 267 parts of salt were added and the mass was stirred for 2 hours longer, the product being then filtered off and washed with 20% salt solution until the filtrate was colorless.

The product dyes acetate silk a reddish-yellow shade much superior to present dyes of the same general class in light fastness and phototropicity; i. e., it does not show a change in shade on short exposure to sunlight.

*Example 6*

The color of the above example was made into the product of the following formula

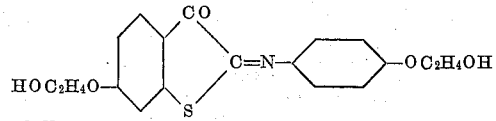

as follows:

The product of Example 5 was dissolved in 500 parts water and 15 parts ethylene chlorhydrin, and 25 parts of 30% caustic soda solution were added in three portions in the course of 1½ hours while stirring and heating at 80° C. Then, after ½ hour, the mixture was cooled and the product was filtered off and washed free of alkali. The product was somewhat weaker tinctorially than that of Example 5, but had the same excellent fastness properties.

*Example 7*

The product of the formula

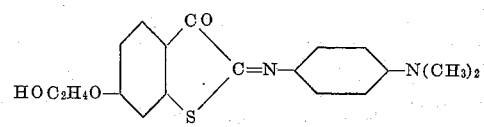

was prepared as follows:

70 parts of 6-ethanoloxy-3-oxy-thionaphthene was dissolved in 2800 parts of 3% caustic soda solution at 40° C. A solution of 50 parts of p-nitroso-dimethyl-aniline in 300 parts alcohol was added and the mixture stirred at 40 to 50° C. for 1 hour. The red product was filtered off, washed with warm water and dried. The product dyed acetate silk and nylon in scarlet shades.

*Example 8*

The product having the formula

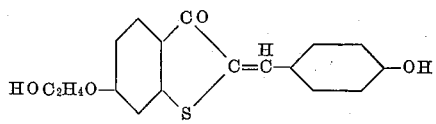

was prepared as follows:

A mixture of 42 parts of 6-ethanoloxy-3-oxy-thionaphthene and 24.5 parts of p-hydroxy-benzaldehyde in 600 parts of alcohol and 150 parts of concentrated hydrochloric acid was heated at reflux temperature for 2 hours. The mixture was then drowned in 2000 parts of water and made alkaline by the addition of caustic soda solution. The resulting solution was filtered and the product precipitated by acidification with hydrochloric acid, filtered off and washed free of acid. The product dyed acetate silk and nylon in yellow shades.

*Example 9*

20 parts of the product of Example 1 were added at 15° C. to 180 parts of sulfuric acid (100%), and the resulting solution was drowned on ice. The sulfate ester thus formed was separated by filtration and dissolved in dilute sodium hydroxide solution, and an aqueous solution of 19 parts of di-o-tolyl-guanidine-hydrochloride was added. The resulting yellow colored product was filtered off, washed and dried. This product dissolved in alcohol, and paper, wood and leather were dyed yellow shades by this solution. It also gave a yellow coloration to lacquer solutions.

It will be understood that the above examples are merely illustrative, and that many variations

We claim:
1. A dyestuff compound of the general formula

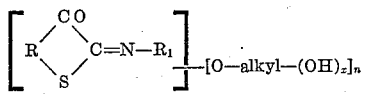

wherein R is an ortho-arylene radical having not more than 10 carbon atoms in its cyclic structure, $R_1$ is an aryl radical having 6 carbon atoms in its cyclic structure, alkyl stands for a lower alkyl radical, while $x$ and $n$ each represent integers not greater than 2, the radicals OH, when $x$ is 2, being attached to different carbon atoms of the alkyl radical.

2. A dyestuff compound of the general formula

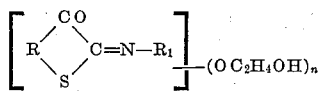

wherein R is an ortho arylene radical having not more than 10 carbon atoms in its cyclic structure, $R_1$ is an aryl radical having 6 carbon atoms in its cyclic structure, while $n$ designates an integer not greater than 2.

3. A dyestuff compound of the general formula

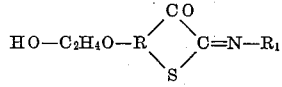

wherein R stands for an ortho-arylene radical having not more than 10 carbon atoms in its cyclic structure, and $R_1$ is an aryl radical having 6 carbon atoms in its cyclic structure.

4. A dyestuff compound of the general formula

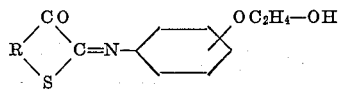

wherein R is an ortho-arylene radical having not more than 10 carbon atoms in its structure.

5. A dyestuff compound of the formula

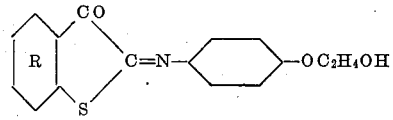

wherein the benzene radical R on the left-hand member carries substituents selected from the group consisting of alkyl, alkoxy and halogen.

6. The dyestuff of the formula

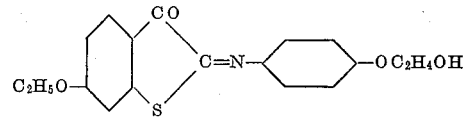

7. The dyestuff of the formula

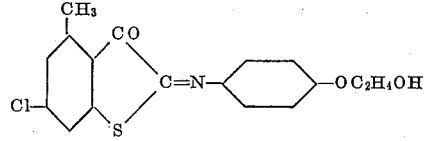

JOHN ELTON COLE.
BENJAMIN FRANKLIN SKILES.